United States Patent Office 3,253,885
Patented May 31, 1966

3,253,885
PURIFICATION OF CRUDE TITANIUM
TETRACHLORIDE
Clarence L. Boyd, Henderson, Nev., assignor to Titanium Metals Corporation of America, New York, N.Y., a corporation of Delaware
No Drawing. Filed May 23, 1963, Ser. No. 282,554
8 Claims. (Cl. 23—87)

This invention relates to the purification of titanium tetrachloride.

One of the principal impurities in crude $TiCl_4$, and the impurity which is the most deleterious, is vanadium oxytrichloride, $VOCl_3$. Vanadium compounds impart a brown color to $TiCl_4$ which is disadvantageous if this material is to be used for pigment production. Vanadium oxy compounds contain oxygen which is deleterious if the $TiCl_4$ is to be used for production of titanium metal. Vanadium oxytrichloride appears as an impurity in crude $TiCl_4$ since vanadium occurs as an impurity in most titanium bearing ores which are chlorinated to produce $TiCl_4$.

Separation of $VOCl_3$ from $TiCl_4$ cannot be accomplished by fractional condensation or distillation since the boiling points of these two compounds are so close; $VOCl_3$ boils at 126.7° C. and $TiCl_4$ boils at 136.4° C. A chemical treatment has often therefore been used to convert $VOCl_3$ to a compound having a much different boiling point and which may be readily separated from $TiCl_4$. It is now thought that this conversion results in a reduction of $VOCl_3$ to $VOCl_2$ which is a solid and essentially non-volatile at $TiCl_4$ boiling temperature. However, the process may involve a complexing or chelating action but whatever the mechanism, the treatment does convert the deleterious $VOCl_3$ to some other compound or form which can be separated readily from $TiCl_4$ in a subsequent distillation step. A number of substances have been proposed for $TiCl_4$ treatment; these include metals, sulphur and hydrogen sulphide, a variety of oils of mineral, vegetable and animal origin, and many organic compounds. These treating agents vary widely in their effectiveness, and in their effect on final $TiCl_4$ product quality. For example, metals may introduce unwanted metallic impurities into the $TiCl_4$; $H_2S$ is effective but is expensive, poisonous and dangerous during handling, and tends to raise the sulphur content of the product; certain oils polymerize in contact with $TiCl_4$ and produce difficult-to-handle rubbery residues which hinder heat transfer in boilers and processing equipment; other organic compounds carbonize in the presence of $TiCl_4$ and their use results in a carbonaceous sludge problem, as well as tending to increase the carbon content of the $TiCl_4$.

A long-felt need has existed, in spite of much previous work in the field, for a treating agent which would convert the $VOCl_3$ content of $TiCl_4$ to a non-volatile material and which would accomplish this effectively, at reasonable cost, without introducing processing problems and without contaminating the $TiCl_4$ product.

A principal object of this invention is therefore, to provide an improved process for purification of crude $TiCl_4$. Another object of this invention is to provide a simpler and more effective process for purifying crude $TiCl_4$. Another object of this invention is to provide an effective process for purifying $TiCl_4$ employing a treating agent combination which will not cause processing difficulties and which will not contaminate the $TiCl_4$ product. These and other objects of this invention will be apparent from the following description thereof.

This invention in its broad aspects contemplates admixing crude $TiCl_4$ with a treating agent consisting of a combination of titanium trichloride, $TiCl_3$, and white mineral oil. The treating agent converts the $VOCl_3$ impurity to a non-volatile material which is readily separated from $TiCl_4$ by fractional distillation to produce a purified $TiCl_4$ containing no more than 0.01% $VOCl_3$. In a specific embodiment of this invention the $TiCl_3$ constituent is formed in the crude $TiCl_4$ during the chlorination of titanium ore.

The $TiCl_3$ constituent of the treating agent is employed in amount at least 1.8 parts and preferably from 1.8 to 3 parts by weight for each part by weight of $VOCl_3$ in the crude $TiCl_4$ to be treated, and the white mineral oil is employed in amount from 0.2 to 3.0 parts by weight for each part of $VOCl_3$. Crude $TiCl_4$ will vary in its vanadium oxytrichloride content depending largely on the vanadium content of the ore from which it is made. Ordinarily the $VOCl_3$ content of crude $TiCl_4$ will range from about 0.1 to about 1% by weight. It appears from my work that the amounts of $TiCl_3$ and white mineral oil employed for treating should preferably be based on the $VOCl_3$ content of the crude $TiCl_4$ since such proportions give more precise control and effective use of the treating agent. The treating agent evidently should be present in amounts related to the $VOCl_3$ content, and a general addition based on the total $TiCl_4$ weight and representing concentrations rather than reacting amounts could provide too little treating agent if the $VOCl_3$ content is high, or an excess if it is low. This, as explained hereinafter in more detail, is not so disadvantageous with respect to the $TiCl_3$ addition which may be added in excess without deleterious effect on the quality of the product but excess white mineral oil may contaminate the purified $TiCl_4$.

To a degree, the proportions of $TiCl_3$ and white mineral oil are inversely related, that is, the higher amounts within the defined range for $TiCl_3$ are preferably employed in combination with lower amounts within the defined range for white mineral oil.

The admixture of the crude $TiCl_4$ with the $TiCl_3$ and white mineral oil is agitated and heated at a temperature of at least 120° C. for a period of at least 5 minutes and then the $TiCl_4$ may then be distilled from the admixture to produce a purified product. $TiCl_4$ boils at 136° C. at atmospheric pressure and the boiling during distillation will provide adequate agitation. Therefore, some agitation by means, for example, of a mechanical stirrer during the heating period from 120° C. up to the boiling point when distillation starts will provide good reaction conditions. A period of more than 5 minutes at above 120° C. will do no harm, and when treating large commercial batches or operating a continuous system agitation for a number of hours may be desirable. If desired, the purified $TiCl_4$ may be further purified as by treatment in a fractionating column to effect further removal of residual high boilers, as well as low boilers.

Titanium trichloride, $TiCl_3$, must be present in the crude $TiCl_4$ together with white mineral oil to obtain the desired efficient treatment effect. This may be added to the crude $TiCl_4$ as a solid in required proportions. Preferably and more conveniently, the required $TiCl_3$ content of the crude $TiCl_4$ is provided during its manuafcture which will most often involve chlorination of a titanium-bearing ore in the presence of carbon. The general process for production of $TiCl_4$ by this method is well known. For the purpose of this invention, the chlorination operation is carried on so that slightly greater than normal reducing conditions are maintained in the chlorinator resulting in the desired $TiCl_3$ content in the so-produced $TiCl_4$. Adjusting the ratios of the chlorinator feed materials, that is the chlorine, ore and carbon, will accomplish this and to produce a $TiCl_3$ content in the product, a somewhat higher carbon to ore ratio and a somewhat lower chlorine to ore ratio would be employed. This would ordinarily be undesirable since it tends to reduce correspondingly the TiCl$_4$ output. However, in the practice of the present invention, it provides an inexpensive and convenient procedure for providing the required TiCl$_3$ content in the TiCl$_4$.

Analysis of crude TiCl$_4$ for TiCl$_3$ content is not simple, but I have found that operation of a chlorinator with excess carbon to provide reducing conditions so that substantially no chlorine is present in the TiCl$_4$ product gas will indicate the desired reducing conditions and result in a TiCl$_3$ content in the crdue TiCl$_4$ of at least 0.5% and normally in generous excess over that required.

When producing the TiCl$_3$ content in situ during chlorination to produce TiCl$_4$, one will find that accurate control of the amount to be present is, as a practical matter, more difficult to control than when TiCl$_3$ is added as such directly to crude TiCl$_4$. It is better under such conditions to be sure of a minimum TiCl$_3$ content by arranging the chlorination conditions so that somewhat more than the amounts necessarily required according to the prescribed range is formed. The excess over that required will be to some extent disadvantageous but this can be accepted for the benefit of easier and more readily controlled processing. In addition, I have found that a somewhat greater amount of TiCl$_3$ will be required for best treatment results due possibly to the presence of other solids in the crude, absorption effects, and perhaps lower reactivity of TiCl$_3$ produced under chlorination conditions. Therefore, chlorinating titanium ore under conditions to produce at least 0.5% and preferably between about 0.5 and about 3% TiCl$_3$ by weight in the TiCl$_4$ product will represent a reasonable and attainable proportion of TiCl$_3$ and comfortably covering the requirements when ores of a normal range of vanadium content are used as feed. Naturally the lower values within the 0.5 to 3% range will be used with ores containing smaller vanadium contents, producing TiCl$_4$ with VOCl$_3$ content between about 0.005 to 0.5% and higher values will be used when the vanadium content of the ore is greater and more nearly approaches the maximum normally present with VOCl$_3$ content in TiCl$_4$ up to about 1%.

The TiCl$_3$ content is apparently not soluble in the TiCl$_4$; it will ordinarily be present as a suspension of fine particles. Therefore, when crude TiCl$_4$ containing TiCl$_3$ is produced as hereinabove described, the solids content thereof (which may comprise unreacted ore, carbon and various impurities, etc., as well as TiCl$_3$) should not be separated as by filtration or distillation before treatment with white mineral oil since this would remove its TiCl$_3$ content. This aspect of the present invention results in an advantageous saving in processing since it has heretofore been considered necessary, or at least desirable, to separate solids from crude TiCl$_4$ by a distillation step prior to treatment with a treating agent such as vegetable or fish oil, or H$_2$S.

The white mineral oil constituent of the treating agent is a commercial product consisting of a refined, high purity grade of mineral oil sold and identified by the name "white mineral oil." It is clear and colorless and is available in several grades varying in purity and quality required for other applications in the medical and chemical industries. It can be obtained in purity grades designated as U.S.P. (according to specifications of the United States Pharmacopoeia), as N.F. (according to specifications of the National Formulary) and also as "technical" grade. A purity of at least equivalent to "technical" grade is necessary for effective crude TiCl$_4$ treatment and U.S.P. and N.F. grades are preferred. The base, viscosity and other characteristics do not appear to be important; a general guide for selection of a suitable specific oil is shown in Table 1 below. It is to be emphasized that less pure petroleum products such as crude motor oil and other similar and cheaper mineral oils will not not provide the specific treating effect of white mineral oil in combination with TiCl$_3$.

TABLE 1.—WHITE MINERAL OIL

| Grade | U.S.P. | N.F. | Technical |
|---|---|---|---|
| Sayboldt Viscosity, 100° F | 340-365 | 145-155 | 69-100. |
| Odor, Taste | None | None |  |
| Pour Point, °F | 0 to −5 | 0 to 10 | 0. |
| U.S.P. Cloud Point | Passes | Passes | No. |
| U.S.P. Acid Test | Passes | Passes | No. |
| Color Sayboldt | +30 | +30 | 17 to +25. |
| Specific Gravity, 60° F | .880/.895 | .865/.881 | .869/.879. |
| N.F. Requirements |  | Yes | No. |

The TiCl$_3$ and white mineral oil constituents of the treating agent employed according to this invention must both be present in the crude TiCl$_4$ to obtain effective conversion of VOCl$_3$. The mechanism by which this combination of minerals acts to produce this result is not well understood but my work has clearly established that neither the TiCl$_3$ nor the white mineral oil will produce the same effect alone without the other using the advantageous relatively small quantities of each. Table 2 below shows test results employing samples of the same crude TiCl$_4$ and treating with TiCl$_3$ alone, with white mineral oil along and with the combination of these constituents.

TABLE 2

| Test No. | G. TiCl$_3$/g. VOCl$_3$ | Percent VOCl$_3$ in Distillate |
|---|---|---|
| (A) Adding TiCl$_3$ Alone (Percent VOCl$_3$ in TiCl$_4$ 0.374) | | |
| 207-3 | 2.6 | 0.058 |
| 208-1 | 4.9 | <0.004 |
| 209-1 | 8.0 | <0.004 |
| (B) Adding White Mineral Oil Alone (Percent VOCl$_3$ in TiCl$_4$ 0.374) | | |
| 205-2 | 0.2 | 0.369 |
| 206-1 | 1.1 | 0.386 |
| 207-1 | 5.4 | 0.339 |

(C) Combined W.M.O. and TiCl$_3$ Addn. (Percent VOCl$_3$ in TiCl$_4$ 0.341)

| | G. WMO/g. VOCl$_3$ | G. TiCl$_3$/g. VOCl$_3$ | Percent VOCl$_3$ in Distillate |
|---|---|---|---|
| 211-1 | 0.2 | 2.9 | 0.010 |
| 210-1 | 0.6 | 2.9 | <0.004 |
| 213-3 | 1.2 | 3.0 | <0.004 |

The tests in Table 2 were performed by adding TiCl$_3$ and/or white mineral oil to TiCl$_4$ containing the amount of VOCl$_3$ specified. The tests were conducted so as to be comparative and in each case the treating agent was added to the crude TiCl$_4$ in amount shown, the mixture was agitated by heating and boiling and then the purified TiCl$_4$ was separated by distillation.

It will be seen from Table 2 that a comparatively very large amount of TiCl$_3$ alone is necessary to obtain purification according to the tests in Group A. Addition of 2.6 parts of TiCl$_3$ did not produce a purified product containing less than 0.01% VOCl$_3$. The addition of white mineral oil alone in the Group B tests produced substantially no purification even when white mineral oil was used in amount as high as 5.4 parts. Quite different, however, are the results of the Group C tests showing that as low as 0.2 parts white mineral oil with 2.9 parts of TiCl$_3$ produces pure TiCl$_4$ containing only 0.010% VOCl$_3$.

In another strictly comparative pair of tests, a crude TiCl$_4$ containing 0.44% VOCl$_3$ was treated with 1.9 parts of TiCl$_3$ alone and the distilled product showed that the VOCl$_3$ content had been reduced only to 0.35%. Using 1.9 parts of TiCl$_3$ and 0.46 parts of white mineral oil under otherwise identical conditions reduced the VOCl$_3$ content of the distilled $TiCl_4$ to less than 0.004%.

The following examples illustrate selected embodiments of this invention.

*Example 1*

A portion of $TiCl_4$ containing 0.38% $VOCl_3$ was treated with $TiCl_3$ and white mineral oil. $TiCl_3$ was added in amount of 2.6 parts by weight per part of $VOCl_3$ present and white mineral oil of U.S.P. grade was added in amount of 0.53 parts by weight for each part of $VOCl_3$ present.

The admixture was agitated by boiling and refluxing at boiling temperature (about 136° C.) for a period of about 30 minutes. $TiCl_4$ was then distilled from the admixture and condensed and found to be clear, water white and when analyzed, found to contain less than 0.004% $VOCl_3$.

*Example 2*

A portion of a batch of $TiCl_4$ containing 0.09% $VOCl_3$ content was treated according to the same procedure as in Example 1 except that 2.6 parts of $TiCl_3$ and 2.2 parts of white mineral oil of U.S.P. grade for each part of $VOCl_3$ were employed in the treating step. The purified $TiCl_4$ produced was found to be of the same quality as in Example 1.

*Example 3*

A portion of $TiCl_4$ containing 0.34% $VOCl_3$ was treated according to the procedure of Example 1 except that 2.9 parts of $TiCl_3$ and 1.2 parts of white mineral oil of U.S.P. grade for each part of $VOCl_3$ were employed as treating agent. The purified $TiCl_4$ produced was found to be of the same quality as in Example 1.

*Example 4*

A portion of $TiCl_4$ containing 0.51% $VOCl_3$ was treated according to the procedure of Example 1 except that 2.6 parts of $TiCl_3$ and 0.39 part of white mineral oil of technical grade for each part of $VOCl_3$ were employed as treating agent and the admixture was refluxed for a somewhat longer time, about 3 hours, before distillation. The purified $TiCl_4$ produced was found to be of the same quality as in Example 1.

*Example 5*

Rutile of 95.0% purity and of particle size 65 x 200 mesh was fed continuously to a vertical shaft type chlorinator together with coke of 20 x 100 mesh size in amount so that the coke formed 35% by weight of the total. Chlorine was introduced through inlets in the bottom of the furnace to produce a so-called suspended bed type of chlorination operation. The reaction, once properly started, generated sufficient exothermic heat to be self-sustaining, chlorine being continuously introduced in amount to combine with slightly less than the $TiO_2$ introduced as rutile to form $TiCl_4$. The chlorine input and reaction process was monitored by testing for free chlorine in the product gases and operation conditions adjusted so that no free chlorine was found. Under these conditions, due to the chlorine control and relatively large excess of carbon present, the product gases consisted of $TiCl_4$, $TiCl_3$ in amount calculated as about 1% by weight of the $TiCl_4$, together with reaction by-product gases as $CO$ and $CO_2$, as well as chlorides of impurities present in the ore, including $VOCl_3$ in amount 0.38% by weight of the $TiCl_4$. Finely divided solids were also carried over with the product gas stream and comprised of $TiO_2$ coke, siliceous compounds and other impurities present in the ore.

The chlorinator product gases were condensed to form liquid crude $TiCl_4$ containing about 0.38% $VOCl_3$ and about 1% $TiCl_3$ as well as the finely divided carried-over impurity solids. The amount of $TiCl_3$ in the crude $TiCl_4$ represented 2.6 parts by weight of $TiCl_3$ for each part of $VOCl_3$ present.

The crude $TiCl_4$ mixture was transferred without solids separation to a treatment tank equipped with a mechanical revolving paddle-type agitator and heating coils, and concurrently with flow of crude $TiCl_4$ therethrough U.S.P. grade white mineral oil was added in amount of 0.36 part by weight for each part of $VOCl_3$ in the crude $TiCl_4$. Flow of crude $TiCl_4$ and addition of white mineral oil was continuous in relative proportions as noted above, the total throughput being regulated to provide a retention time for the crude $TiCl_4$-$TiCl_3$-white mineral oil mixture in the treatment tank of about 9 hours. The contents of the treatment tank were maintained at a temperature of 117° C. and continuously agitated by means of the mechanical agitator.

After passage through the treatment tank, the treated $TiCl_4$ was transferred to a vaporizer tank where it was held for 3 hours at boiling temperature (about 136° C.) under reflux and $TiCl_4$ was distilled off through a rectifying column and condensed as pure $TiCl_4$. The so-produced pure $TiCl_4$ was clear, water-white and contained less than 0.004% $VOCl_3$.

The pure tetrachloride was of quality suitable for production of titanium metal and purity of this grade would also in general be suitable for $TiO_2$ pigment production. A sample of the $TiCl_4$ produced as described above was reduced to titanium metal by reduction with magnesium following the principles of the Kroll process as described in U.S. Patent No. 2,205,854 in a carefully controlled laboratory test. The titanium metal produced was of excellent quality having a hardness of 79.2 B.h.n. which indicated good ductility and low oxygen content attributed to the purity of the $TiCl_4$ from which it was produced. The carbon content of the metal produced was determined by analysis to be 0.024% indicating acceptably low carbon content in the $TiCl_4$.

Unlike organic treating agents used or proposed heretofore, the $TiCl_3$-white mineral oil combination does not polymerize to form a rubbery or gelatinous mass in the crude $TiCl_4$ nor does the white mineral oil carbonize to produce a carbonaceous precipitate or residue. The white mineral oil is soluble in $TiCl_4$ and produces a clear solution. I have admixed $TiCl_3$ and white mineral oil in amounts within the ranges for these constituents as hereinbefore described with crude $TiCl_4$ from which solids have been removed and refluxed the admixture at boiling temperature for several hours without producing any discernible carbonized or polymerized precipitate. Employment of the treating agent of this invention in a large scale test involving the treatment of over 10,000 pounds of crude $TiCl_4$ showed no residue or precipitate formed as a result of decomposition of the treating agent and no trouble was experienced with fouling of boiler tube and reaction vessel surfaces.

The amounts of both $TiCl_3$ and white mineral oil to be used as a treating agent are critical within the defined limits. Use of less than 1.8 parts of $TiCl_3$ per part of $VOCl_3$ will not provide effective conversion of $VOCl_3$, even if a maximum amount of white mineral oil (within its range) is employed. More than 3 parts of $TiCl_3$ for each part of $VOCl_3$ is not harmful to the product quality as far as deleterious impurities are concerned but its use in excess is wasteful and reduces the $TiCl_4$ content of the product. Less than 0.2 part of white mineral oil per part of $VOCl_3$ will not produce efficient treating even with the maximum amount of $TiCl_3$ and more than 3 parts per part of $VOCl_3$ would constitute a wasteful excess and additionally will tend to undesirably increase the carbon (or organic compound) content of the purified $TiCl_4$.

From the results from a comprehensive series of tests, I have discovered that employment of $TiCl_3$ and white mineral oil within the ranges hereinbefore defined and in combination produces effective conversion of $VOCl_3$ and accomplishes this at a low cost without producing difficult-to-handle or carbonaceous residues and without contaminating the $TiCl_4$ product.

I claim:
1. A method for producing purified $TiCl_4$ containing no more than 0.01% by weight of $VOCl_3$ from crude $TiCl_4$ containing $VOCl_3$ which comprises:
   (a) admixing said crude $TiCl_4$ with a treating agent comprising at least 1.8 parts by weight of $TiCl_3$ and from 0.2 part to 3 parts by weight of white mineral oil for each part by weight of $VOCl_3$ contained in said crude $TiCl_4$,
   (b) agitating and heating said admixture at a temperature of above 120° C. for a period of at least 5 minutes, and,
   (c) distilling purified $TiCl_4$ from said agitated and heated admixture.

2. A method according to claim 1 in which the white mineral oil is at least as pure as technical grade.

3. A method for producing purified $TiCl_4$ containing no more than 0.01% by weight of $VOCl_3$ from crude $TiCl_4$ containing $VOCl_3$ which comprises:
   (a) admixing said crude $TiCl_4$ with a treating agent comprising from 1.8 parts to 3 parts by weight of $TiCl_3$ and from 0.2 part to 3 parts by weight of white mineral oil for each part by weight of $VOCl_3$ contained in said crude $TiCl_4$,
   (b) agitating and heating said admixture at a temperature of above 120° C. for a period of at least 5 minutes, and,
   (c) distilling purified $TiCl_4$ from said agitated and heated admixture.

4. A method according to claim 3 in which the lower amounts within the defined range for $TiCl_3$ are employed with the higher amounts within the defined range for white mineral oil and the higher amounts within the defined range for $TiCl_3$ are employed with the lower amounts within the range defined for white mineral oil.

5. A method for producing purified $TiCl_4$ containing no more than 0.01% $VOCl_3$ from a vanadium-containing titanium ore which comprises:
   (a) chlorinating said ore at elevated temperature under reducing conditions to produce a crude $TiCl_4$ containing $VOCl_3$ and containing impurity solids, including $TiCl_3$ in amount at least 0.5% by weight of said crude $TiCl_4$,
   (b) admixing said crude $TiCl_4$ containing said $VOCl_3$ and impurity solids with from 0.2 part to 3 parts by weight of white mineral oil for each part of $VOCl_3$ contained in said crude $TiCl_4$,
   (c) agitating and heating said admixture at a temperature of above 120° C. for a period of at least 5 minutes, and,
   (d) distilling purified $TiCl_4$ from said agitated and heated admixture.

6. A method according to claim 5 in which the $TiCl_3$ contained in said crude $TiCl_4$ is at least 0.5% and up to 3% by weight of said crude $TiCl_4$.

7. A method for producing purified $TiCl_4$, containing no more than 0.01% by weight of $VOCl_3$ from a vanadium-containing titanium ore which comprises:
   (a) chlorinating said ore at elevated temperature in the presence of sufficient excess carbon to insure reducing conditions during such chlorination to produce crude $TiCl_4$ containing $VOCl_3$ and containing impurity solids, including $TiCl_3$ in amount at least 0.5% by weight of said crude $TiCl_4$,
   (b) admixing said crude $TiCl_4$ containing said $VOCl_3$ and impurity solids with from 0.2 part to 3 parts by weight of white mineral oil for each part of $VOCl_3$ contained in said crude $TiCl_4$,
   (c) agitating and heating said admixture at a temperature of above 120° C. for a period of at least 5 minutes, and,
   (d) distilling purified $TiCl_4$ from said agitated and heated admixture.

8. A method for producing purified $TiCl_4$ containing no more than 0.01% by weight of $VOCl_3$ from a vanadium-containing titanium ore which comprises:
   (a) chlorinating said ore at elevated temperature in the presence of sufficient excess carbon to insure reducing conditions during such chlorination so that the $TiCl_4$ produced by such chlorination will contain substantially no free chlorine thereby to produce crude $TiCl_4$ containing $VOCl_3$ and containing impurity solids, including $TiCl_3$ in amount at least 0.5% by weight of said crude $TiCl_4$,
   (b) admixing said crude $TiCl_4$ containing said $VOCl_3$ and impurity solids with from 0.2 part to 3 parts by weight of white mineral oil for each part of $VOCl_3$ contained in said crude $TiCl_4$,
   (c) agitating and heating said admixture at a temperature of above 120° C. for a period of at least 5 minutes, and,
   (d) distilling purified $TiCl_4$ from said agitated and heated admixture.

References Cited by the Examiner

UNITED STATES PATENTS

| | | | |
|---|---|---|---|
| 2,178,685 | 11/1939 | Gage | 23—87 |
| 2,592,021 | 4/1952 | Frey et al. | 23—87 |
| 2,890,100 | 6/1959 | Davis et al. | 23—87 |
| 3,009,541 | 11/1961 | Mas et al. | 23—87 |

FOREIGN PATENTS

| | | |
|---|---|---|
| 208,193 | 4/1957 | Australia. |
| 219,384 | 12/1958 | Australia. |
| 874,551 | 8/1961 | Great Britain. |

BENJAMIN HENKIN, *Primary Examiner.*

MAURICE A. BRINDISI, *Examiner.*

E. STERN, *Assistant Examiner.*